(12) United States Patent
Frome

(10) Patent No.: US 8,600,102 B1
(45) Date of Patent: Dec. 3, 2013

(54) SYSTEM AND METHOD OF IDENTIFYING ADVERTISEMENT IN IMAGES

(75) Inventor: Andrea Frome, Berkeley, CA (US)

(73) Assignee: Google Inc., Mountain View, CA (US)

( * ) Notice: Subject to any disclaimer, the term of this patent is extended or adjusted under 35 U.S.C. 154(b) by 256 days.

(21) Appl. No.: 13/236,032

(22) Filed: Sep. 19, 2011

(51) Int. Cl.
*G06K 9/00* (2006.01)

(52) U.S. Cl.
USPC .......................................... 382/100; 382/181

(58) Field of Classification Search
None
See application file for complete search history.

(56) References Cited

U.S. PATENT DOCUMENTS

| | | | |
|---|---|---|---|
| 8,254,699 B1 * | 8/2012 | Zhao et al. | 382/224 |
| 8,315,423 B1 * | 11/2012 | Jing et al. | 382/100 |
| 8,385,971 B2 * | 2/2013 | Rhoads et al. | 455/556.1 |
| 2010/0260426 A1 * | 10/2010 | Huang et al. | 382/218 |
| 2011/0212717 A1 * | 9/2011 | Rhoads et al. | 455/420 |
| 2011/0244919 A1 * | 10/2011 | Aller et al. | 455/556.1 |
| 2013/0011062 A1 * | 1/2013 | Conwell et al. | 382/173 |
| 2013/0077835 A1 * | 3/2013 | Kritt et al. | 382/118 |

* cited by examiner

*Primary Examiner* — Claire X Wang
*Assistant Examiner* — Thomas A James
(74) *Attorney, Agent, or Firm* — Lerner, David, Littenberg, Krumholz & Mentlik, LLP

(57) ABSTRACT

A system and method is provided wherein, in one aspect, a processor determines whether multiple street level images have captured a nearly-identical face. If so, the images are processed to determine whether the face appears to be part of an advertisement. Once it is determined that the face is displayed on an advertisement, the boundaries of the advertisement may be determined and the location of the advertisement is stored for future use, e.g., potentially replacing the advertisement in the image with a different advertisement.

34 Claims, 6 Drawing Sheets

SYSTEM AND METHOD OF IDENTIFYING ADVERTISEMENT IN IMAGES

BACKGROUND OF THE INVENTION

Street level images of geographic locations may be displayed through map services, such as Google Maps with Street View. These images typically comprise photographs of buildings, surrounding neighborhoods, and other features to allow a user to view a geographic location from a person's perspective as compared to a top-down map perspective.

Street View applies edge face and license plate blurring technology to street level images. If one of the images contains an identifiable face (for example that of a passer-by on the sidewalk) or an identifiable license plate, processors automatically blur it out to mitigate the likelihood that the individual or the vehicle can be identified. If our detectors missed something, you can easily let us know.

Advertisements occur everywhere, and are thus can be found throughout street view images, e.g., on billboards and in shop windows.

SUMMARY OF THE INVENTION

In one aspect, a method of analyzing an image is provided. Street level images captured at different locations and/or times are selected from among a plurality of street level images, wherein the street level images. A processor detects whether face images are contained in the street level images and, if so, determines whether the face images are similar. If so, the processor determines whether one or both the street level images have captured an advertisement based on whether the likelihood of the faces that were at the locations captured in the images are likely to be identical. It determines whether the locations and times of capture are likely to indicate the faces are identical. If so, the processor identifies the portions of the street level image(s) that are likely associated with an advertisement at the locations, and does so by analyzing the images surrounding the detected face images.

In another aspect, a method of determining a presence of an advertisement in an image is provided. The method may include receiving an image related to a first geographic location; detecting, with a processor, a face in the image; comparing, with the processor, the detected face to a plurality of faces found in a plurality of images, at least one of the plurality of images being related to a second geographic location; determining, based on the comparison, whether an advertisement with the detected face is present in the received image; and analyzing, with the processor, image features outside the detected face when it is determined that an advertisement is present in the received image, the processor.

In still a further aspect a system of determining presence of an advertisement in an image is provided. The system may include a processor and a memory accessible to the processor. The instruction of the memory may include receiving an image related to a first geographic location; detecting a face in the image; comparing the detected face to a plurality of faces found in a plurality of images, at least one of the plurality of images being related to a second geographic location; determining, based on the comparison, whether an advertisement with the detected face is present in the received image; and analyzing image features outside the detected face when it is determined that an advertisement is present in the received image.

DETAILED DESCRIPTION

In one aspect, a system and method is provided wherein a processor determines whether multiple street level images have captured a nearly-identical face. If so, the images are processed to determine whether the face appears to be on an advertisement. Once it is determined that the face is displayed on an advertisement, the boundaries of the advertisement may be determined and the location of the advertisement is stored in a database for future use, e.g., potentially replacing the advertisement in the image with a different advertisement.

Figure 1:
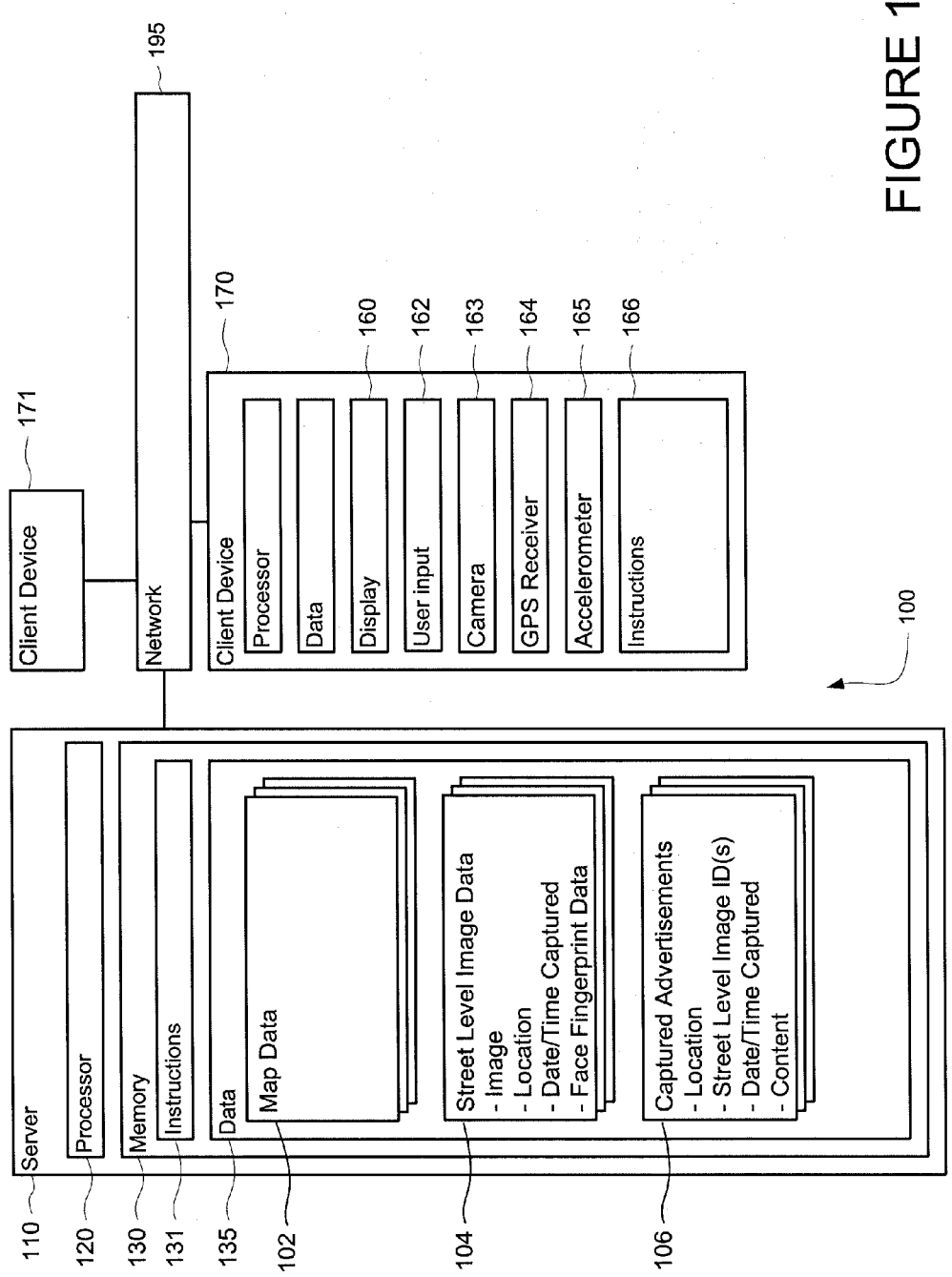
FIG. 1 is a function diagram of a system in accordance with aspects of the invention.

As shown in FIG. 1, an exemplary system 100 may include computers 110, 170, and 171. Computer 110 may contain a processor 120, memory 130 and other components typically present in general purpose computers.

Memory 130 of computer 110 stores information accessible by processor 120, including instructions 131 that may be executed by the processor 120. Memory also includes data 132 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as commercially available processors. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable optical disk and others within a read only computer chip. Some or all of the instructions and data may be stored in a location physically remote from, yet still accessible by, the processor. Similarly, the processor may actually comprise a collection of processors which may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to a user on a screen of client device 170. Server 110 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising server 110.

Each client device may be configured similarly to the server 110, with a processor 160, memory 161, instructions 162, and data 140. Each client computer 170-71 may be a personal computer, intended for use by a person 190 91, having all the internal components normally found in a personal computer such as a central processing unit (CPU), display device 163 (for example, a monitor having a screen, a projector, a touch-screen, a small LCD screen, a television, or another device such as an electrical device that is operable to display information processed by the processor), CD ROM, hard drive, user input 164 (for example, a mouse, keyboard, touch screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set top boxes for televisions, and other networked devices.

Although the computers 170-71 may comprise a full-sized personal computer, the system and method may also be used in connection with mobile devices capable of wirelessly exchanging data with a server over a network such as the Internet. By way of example only, client device 171 may be a wireless-enabled PDA, hand-held or in-car navigation device, tablet PC, netbook, or a cellular phone capable of obtaining information via the Internet. The user may input information, for example, using a small keyboard, a keypad, or a touch screen.

The server 110 and client computers 170-71 are capable of direct and indirect communication, such as over network 195. Although only a few computers are depicted in FIG. 1, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11 standards), and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk. Yet further, although some functions are indicated as taking place on a single client device having a single processor, various aspects of the system and method may be implemented by a plurality of computers, for example, communicating information over network 195.

Map data 102 may contain various map elements, including the information that may be used to render maps, such as bitmapped tiles of maps or vector graphics. The map database may store other information as well, such as the location of street addresses, businesses and other points of interest. The map information is not limited to any particular format.

The system and method may process locations expressed in different ways, such as latitude/longitude positions, street addresses, street intersections, x-y coordinates with respect to the edges of a map (such as a pixel position when a user clicks on a map), names of buildings and landmarks, and other information in other reference systems that is capable of identifying geographic locations (e.g., lot and block numbers on survey maps). Moreover, a location may define a range of the foregoing. Locations may be further translated from one reference system to another. For example, the system may include a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as 37.423021°, −122.083939°).

Figure 2:
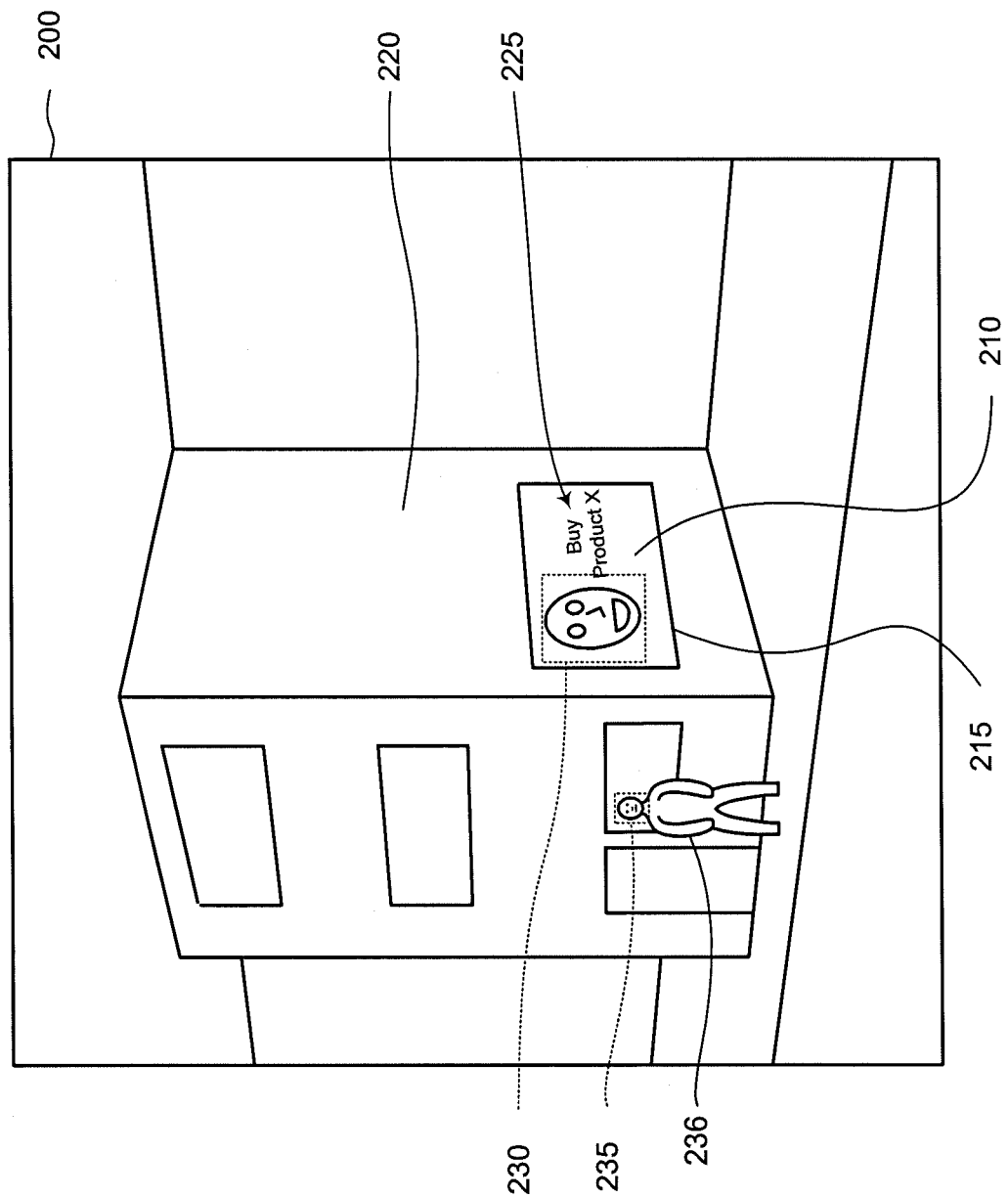
FIG. 2 is a sample street level image.

Street level image data 104 contains images associated with the map data. Street level images comprise images of objects at geographic locations, captured by cameras at geographic locations, in a direction generally parallel to the ground. Thus, as shown in the street level image 200 in FIG. 2, a street level image data may represent various geographic objects such as buildings, sidewalks, streets, billboards and vehicles from a perspective of a few feet above the ground and looking down the street. While street level image 200 only shows a few objects for ease of explanation, a typical street level image will contain many objects associable with geographic locations (street lights, mountains, trees, bodies of water, vehicles, people, etc.) and objects within the view of the camera, and these object may be in as much detail as the camera is able to capture.

The street level image may be captured by a camera mounted on top of a vehicle, at a camera angle pointing roughly parallel to the ground and from a camera position at or below the legal limit for vehicle heights (e.g., 7-14 feet). Street level images are not limited to any particular height above the ground or camera angle. For example, a street level image may be taken from the top of a building and a camera mounted on a vehicle may capture images at multiple angles so as to cover a viewing sphere. Each street level image may be stored as a set of pixels associated with color and brightness values. For example, if the images are stored in JPEG format, the image will be displayed as a set of pixels in rows and columns, with each pixel being associated with a value that defines the color and brightness of the image at the pixel's location.

In addition to being associated with geographic locations, street level images may be associated with information indicating the orientation of the image. For example, if the street level image comprises a typical photograph, the orientation may simply be the camera angle, which in turn may be represented as an angle that is 30° East of true North and rises 2° from ground level.

Besides the orientation or the camera angles, street level image data in image database 104 may store various types of data associated with the image. For example, timing information indicating when the image was captured.

Figure 3:
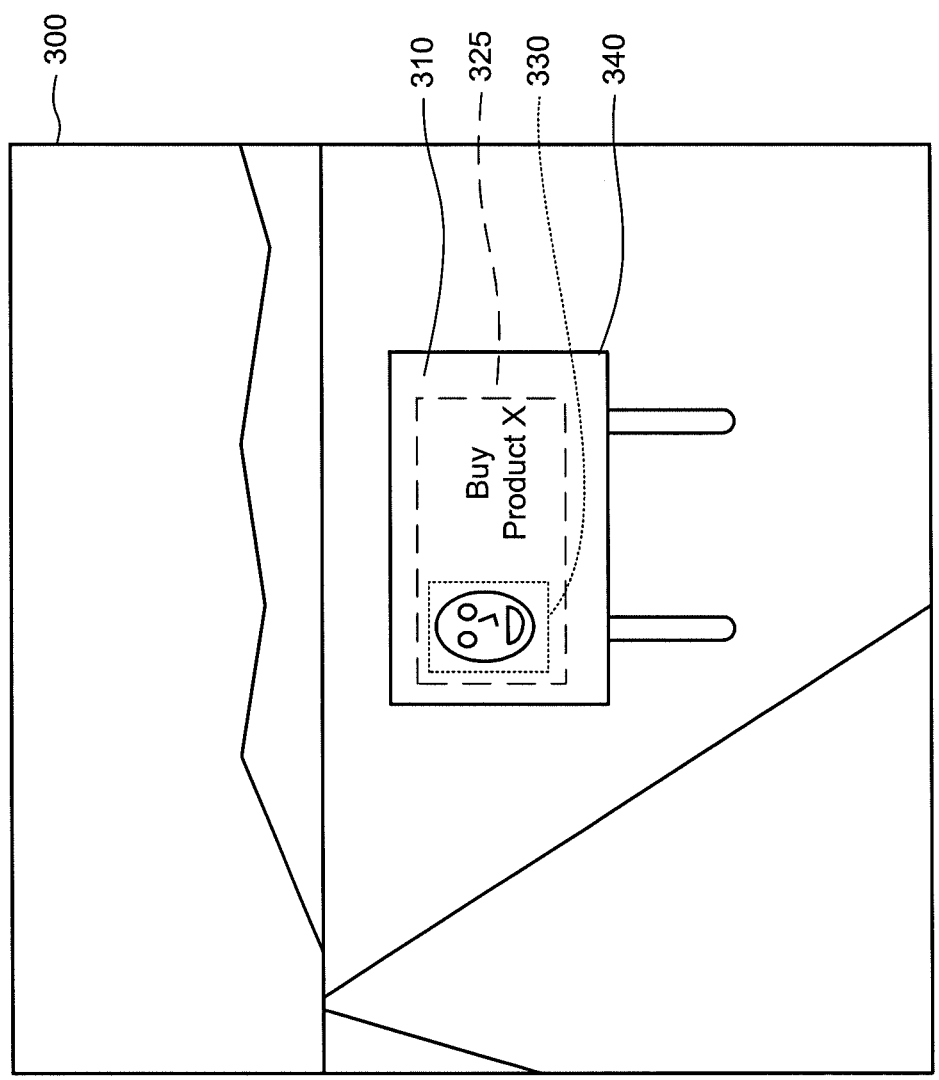
FIG. 3 is a sample street level image.

The system and method may also store data identifying the location of advertisements appearing in a street level image (such advertisements being referred to herein as "captured advertisements"). The advertisements may be any type of advertisement typically found in a neighborhood, such as the location of large poster 210 on building 220 in image 200 of FIG. 2. The captured advertisement data may also identify the location of a billboard 310 erected on a roadside as captured in street level image 300 shown in FIG. 3. The advertisement may also be a screen shot of an LCD display at an intersection. The captured advertisements may also be mobile, e.g., on the sides or tops of vehicles.

The data identifying the location of advertisements may be stored in various ways. By way of example, the system and method may store the advertisement location relative to the image, such as identifying the pixel locations of edges 215 of the advertisement 210. The captured advertisement's location may also be defined relative to the geographic area captured in the image, e.g., the latitude/longitude/altitude coordinates of the vertices of the advertisement as well as the street address that is nearest to the advertisement.

The data relating to a captured advertisement may further identify the content of the captured advertisement (e.g., the advertised product), the advertisement carrier (e.g., the owner of the billboard), and timing information (e.g., the date and time that the image was taken) and the street level image(s) in which the advertisement appears.

Figure 5:
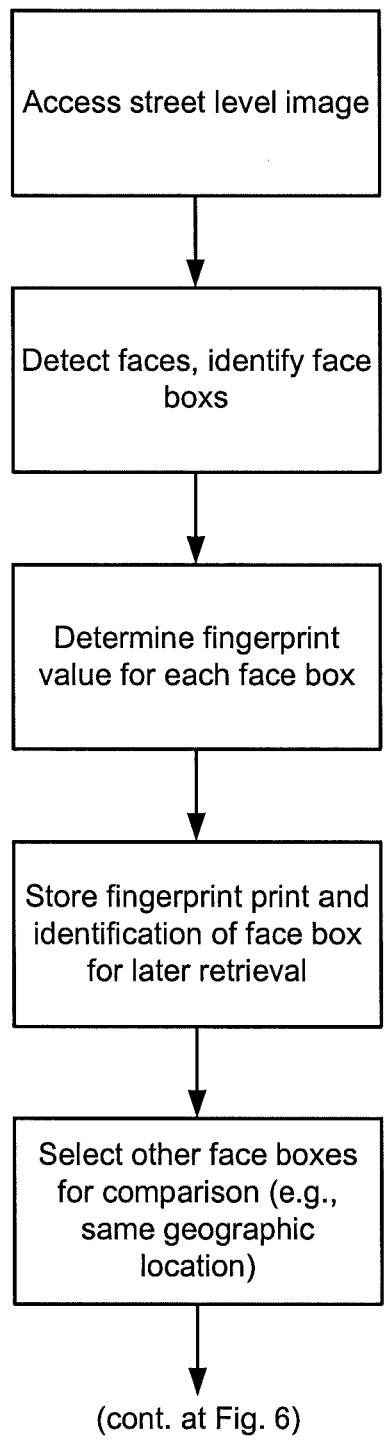
FIG. 5 is flowchart in accordance with an aspect of the system and method.
Figure 6:
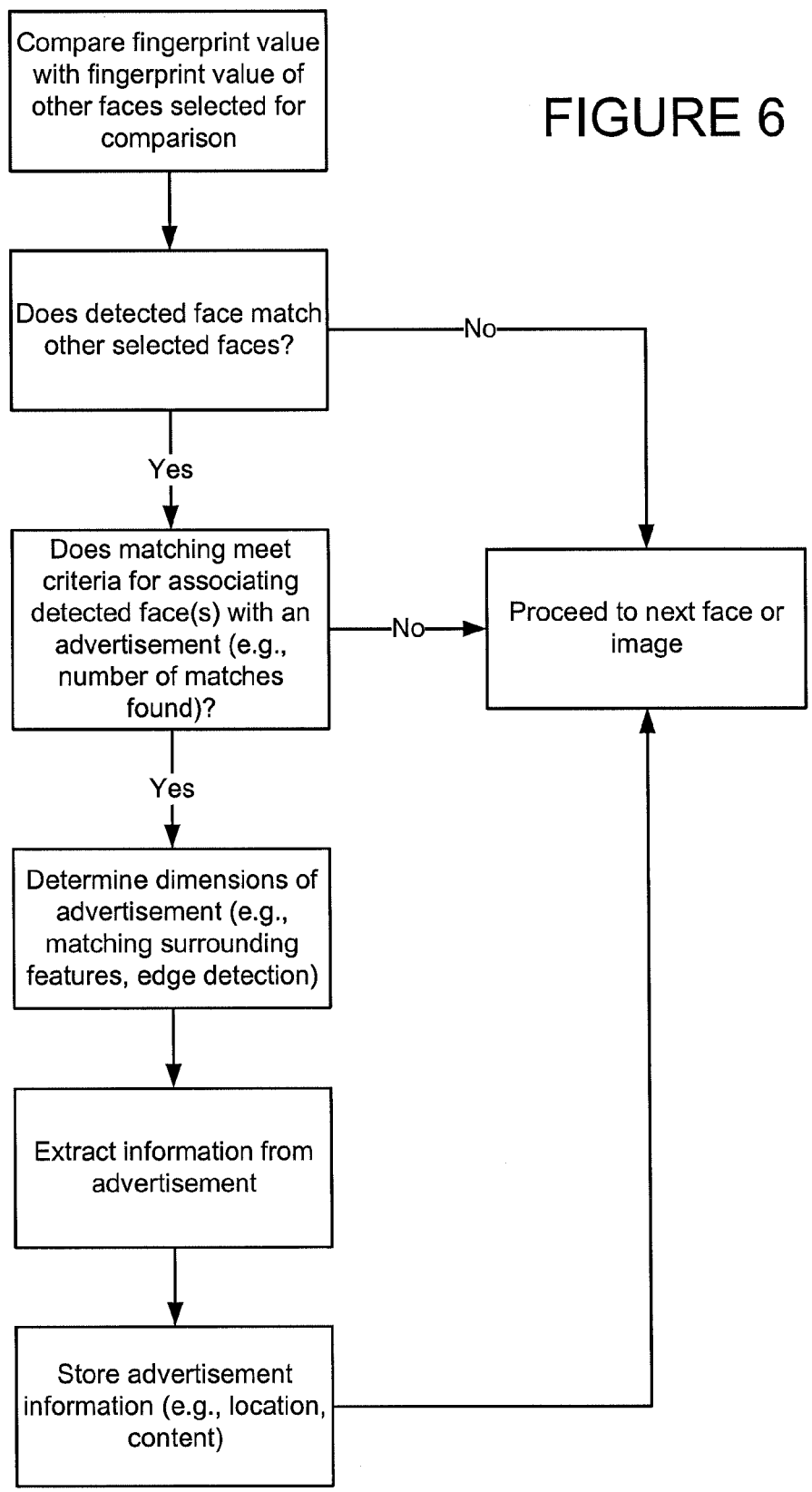
FIG. 6 is flowchart in accordance with an aspect of the system and method.

In addition to the operations illustrated in FIGS. 5-6, operations in accordance with system and method will now be described. Various operations can be handled in a different order or simultaneously, and each operation may be composed of other operations.

In one aspect, a processor analyzes a street level image and identifies portions of the image that appear to correspond with a face. For example, server 110 may analyze image 200 of FIG. 2 and, using a face detection algorithm, may determine that the areas bounded by boxes 230 and 235 has a high probability of being a face. Similarly, server 110 may determine that box 330 of image 300 shown in FIG. 3 contains a face.

Various face detection algorithms may be used to analyze the images. For example, a sliding-window face detection algorithm may be used. The face detector may use a range of window sizes and employ a linear combination of heterogeneous set of feature detectors to detect various types of image features encompassing varying complexity. Each window may be assigned a score indicating the probability of a face being present and an overall probability may be obtained as a weighted average of all the windows' scores. The algorithm may be trained and tuned for low recall but relatively high precision. The system may also employ other suitable mechanisms that pinpoint facial feature locations within a face bounding box and extract features from the pinpointed locations to obtain refined scores indicating the probability of a face being present. Such other mechanisms may also be used and trained to achieve a recall/precision trade-off that is suitable for low recall and high precision face detection in a large amount of images.

Yet further and in some aspects, the same algorithms that are used to identify faces for blurring purposes may be used for the purpose of identifying advertisements as well.

The system and method may also associate the faces detected in the image with values that may be used to determine whether one detected face matches another detected face. For example, the face images within face boxes 230 and 235 may be represented by a set of data with a reduced information density than the original image data for the purpose of relatively fast comparison and matching with other detected faces in other images. The processor may use feature extraction and fingerprinting algorithms to obtain unique signatures (e.g., in the form of a vector of numbers) for each identified face box.

Various suitable methods may be employed by the system to fingerprint a detected face. One approach is to use a Haar wavelet decomposition method for doing near-duplicate detection across the images. Another fingerprinting approach may use SIFT or Congas feature extractions in repeatable locations relative to the frame of the face box. As such, each face box may be represented by a normalized feature vector of integer numbers (e.g., up to 128 bits) after the fingerprinting. The system may further be configured to tolerate small affine transformations (such as scaling, rotation, translation, flipping, etc.) and variations in the face color. By way of example, the face bounded by face box 230 may be identical to the face bounded by face box 330, but the different viewing angles of images 200 and 300 may cause the features of the two faces to have differences in scale and translation. Image features such as face appearance, lighting, and pose may also be determined and represented in the fingerprint values so that variations in these features (e.g., due to the time of day) may be taken into account during the process of comparison/matching.

The values determined for the detected faces may be stored such that the system and method can quickly determine whether the identical face has been found elsewhere in the image or in other images. For example, the system and method may use various hashing algorithms to sort and organize the vectors of the extracted features of the detected face boxes and detect collisions in the data set. Locality-sensitive hashing that allows vectors to be searched somewhat independently may be performed to obtain probabilistic reduction of the vector dimensions where similar data item are mapped to the same group. String hashing may also be used by conflating elements of the hash vector.

After the values associated with a detected face are extracted, the system and method may determine whether the values match the values associated with another detected face. By way of example only, two face fingerprint values may be considered a match when the values indicate that the two faces are identical, e.g., the same face image has been captured at two different locations or the same face image appears twice in the same street level image. Server 110 may iterate through many different face boxes, ignoring face boxes that have no match and further processing face boxes that have a match. If previously detected face fingerprint values are stored in a hash table, the hash value of the detected face value may be used to identify—if available—a face box with an identical face value. Using the example of FIGS. 2 and 3, the system and method would determine that face box 330 matches face box 230 but not face box 235 of pedestrian 236.

The matching procedure may not require face images or their fingerprint values to be completely identical. Rather, two detected faces may be considered a match when they are sufficiently similar in accordance with conditions required by the system and method. In that regard, the processor may account for the different camera angles of images 200 and 300, their different sizes, different lighting conditions, etc.

The matching may be performed across all of the faces detected by the system and method, or a subset thereof. For example, the matching may be restricted by geographic location, such as by only comparing faces located within a common geographic region, within (and/or greater than) a specific distance from each other, or various combinations thereof. The matching may be limited by quantity, e.g., any particular detected face may be compared with a limited number of other detected faces, such limit being predetermined or dynamically tuned.

When matching face boxes are found in the images, the system and method may conclude that the faces indicate the presence of an advertisement. For instance, if the identical face was captured in multiple locations, the face may comprise a portion of an advertisement displayed in multiple locations (e.g., the same advertisement may appear on three different billboards at three different locations). Moreover, if the identical face was captured multiple times in the same image, it may indicate a collection of identical posters.

The criteria for determining whether a match indicates an advertisement may be based on various criteria including. The criteria may depend on the number of different images in which the identical face is found, or the number of different locations at which the face appears. The criteria may also depend on the physical distance between different locations at which the same face appears. For example, if the same face is found in many different locations within a relatively large geographic area, the processor may determine that face is part of an advertisement.

The criteria may also depend on the time that the image was captured. For example, if the same face appears in the same location every time a street level image at the location is captured, it is likely that the captured face image is a photograph rather than a stationary person.

Yet further, the criteria may depend on combinations of different factors. For instance, if the same face appears in three different locations taken at three different times, it is possible that the street level images happened to capture the same person when that person was at each different location. However, the processor may determine that the face is likely to be advertisement if it is unlikely that the same person could have traversed the distance between locations within the time between image capture.

The criteria may further include criteria that is intended to avoid further analysis of face images that reflect the faces of people physically present at the relevant locations (as compared to an advertisement). For example, the system and method may analyze the depth information (if available) at or surrounding the face image to determine whether the 3D characteristics of the face image indicate that the captured face may be that of a person standing or otherwise physically present at the location. In that regard, if the 3D location(s) of the surfaces associated with the face portion of the image are on the same plane, and if the 3D location(s) of the surfaces are also on the same plane, then the system and method may determine that the captured face image is an advertisement or more likely to be an advertisement.

If the system and method determines that the faces are not near identical, or the faces are unlikely to be an advertisement based on any other criteria, the system and method may accommodate increased privacy concerns by not storing the conclusion that a match or near match was found between different street level images.

When the system and method determines that identical or near-identical face boxes likely indicate the presence of an advertisement, the process may then attempt to determine the space occupied by the remainder of the advertisement. Feature extraction and analysis may be performed on the area outside the face box in order to determine the extent/dimension of the advertisement space.

In one aspect, the system and method may determine whether features surrounding the matching face box also match. The system may apply image feature extraction techniques (e.g., obtaining densely-sampled SIFT or Congas features) to the area in the image outside the face box. In that regard, because the text adjacent to face box 325 matches the text adjacent to face box 225, the system and method may determine that the dimensions of the advertisement include at the least the area 325, which encompasses all of the matching features.

Figure 4:
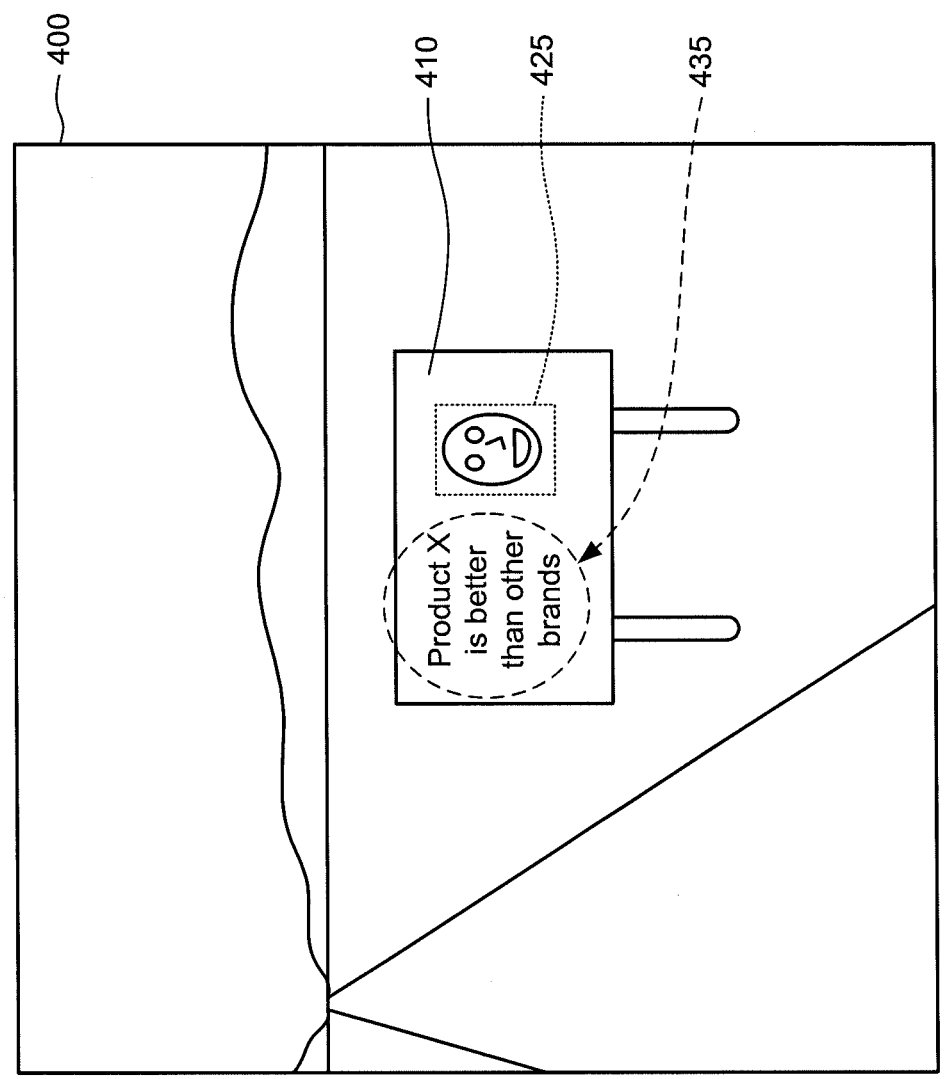
FIG. 4 is a sample street level image.

The system and method may not necessarily require the surrounding features to be completely identical in order to determine that there is a sufficient match to conclude that the detected face is part of an advertisement. As shown in FIG. 4, the face box 425 of advertisement 410 in image 400 may be identical to face box 225 of image 200, but text 435 is not identical to the content or placement the text in advertisement 210. Even so, advertisement 410 may still be considered a match with advertisement 210 if the detected faces are identical. (The system and method may also use OCR or other feature matching to compare the content of the surrounding text and find enough features, such as the words "Product X", to find a match.)

The boundaries of the advertisement may also be determined by other techniques. For example, edge detection may look for edges forming a rectangular boundary outside the face box. In that regard, the processor or server 110 may identify the edges 340 of advertisement 310, and store the dimensions of the advertisement accordingly. It may similarly identify edges 215 of advertisement 210. The system and method may further include instructions to determine various types of advertisement attributes, e.g., the media type or space type of the advertisement (a poster, an LCD screen shot, a banner, a billboard, etc.).

Once the boundaries of the advertisement are determined, they may be stored in captured advertisement data 106. For example, the locations of the edges 340 within image 300 may be stored with respect to their pixel locations relative to the edges of the image 300. Moreover, the 3D location of the surfaces shown in a street level image may have been captured by a laser range finder at the time the image was taken, thus permitting the server to associate the pixels in a street level image with latitude/longitude/altitude coordinates. In that regard, the location and boundaries of the advertisement may also be stored with respect to latitude/longitude/altitude coordinates.

In addition to storing the advertisement location, the system and method may extract the content of the advertisement and, where shown, the advertisement carrier. Captured advertisement data 106 may also store the date and time that the advertisement was captured as well as an identification of the street level image(s) in which the advertisement appears.

The system and method may perform various operations in response to identifying the advertisement. For example, when displaying street level image 200 to an end user, the server 110 may determine whether any advertisements are present in the image, identify advertisement 210 in response, and overlay a different advertisement on top of advertisement 210. The server may notify the end user that the advertisement has been replaced.

Yet further, the system and method may use the identified advertisements for data mining or market analysis (e.g., analyze the presence or scalability of a product's advertisements).

The System and method is not limited to identifying any particular type of advertisement, nor limited to street view images or panoramas, but may be used for identifying any desired advertisement with any suitable image data.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, any appropriate face detector for detecting faces in a large scale with a target of low precision and high recall may be employed in any configuration herein. Each way of fingerprinting a face or reducing the density of the representative information of a face may be used in any configuration herein. Any data structure for representing a fingerprint of a face may be employed. Any suitable hashing function may be used with any of the configurations herein.

The invention claimed is:

1. A method of determining a presence of an advertisement in an image, the method comprising:
   receiving an image related to a first geographic location;
   detecting, with a processor, a face in the image;
   comparing, with the processor, the detected face to a plurality of faces found in a plurality of images, at least one of the plurality of images being related to a second geographic location;
   determining, based on the comparison, whether an advertisement with the detected face is present in the received image; and
   analyzing, with the processor, image features outside the detected face when it is determined that an advertisement is present in the received image, the processor.

2. The method of claim 1, wherein detecting a face in the image comprises analyzing the image with a sliding-window face detector tuned based on recall and precision.

3. The method of claim 1, wherein comparing the detected face to the plurality of faces comprises:
   fingerprinting the detected face to represent the detected face in a data set of a vector of numbers; and
   comparing the fingerprint of the detected face to fingerprints for corresponding ones of the plurality of faces.

4. The method of claim 3, wherein the fingerprinting is performed using Haar wavelet decomposition.

5. The method of claim 3, wherein the fingerprinting is performed with SIFT or Congas features of the detected face.

6. The method of claim 3, wherein the comparing further comprises hashing the vector of numbers through locality sensitive hashing or standard string hashing.

7. The method of claim 1, wherein determining if the advertisement is present comprises finding, from the plurality of faces, at least one face identical to the detected face.

8. The method of claim 1, wherein determining if the advertisement is present comprises finding, from the plurality of faces, at least one face where the similarity between the detected face and the at least one face is above a predetermined threshold.

9. The method of claim 1, wherein analyzing the image features comprises:
   extracting image features of areas outside the face in the received image; and
   matching the extracted image features to image features of areas outside the plurality of faces in the plurality of images.

10. The method of claim 1, wherein analyzing the image features comprises determining a boundary of the advertisement.

11. The method of claim 10, wherein the boundary of the advertisement is determined through edge detection.

12. The method of claim 1, wherein at least another one of the plurality of images is related to the first geographic location and was captured at a time different from a time where the received image was taken.

13. The method of claim 1, wherein the advertisement comprises one of a billboard, a poster, and a banner.

14. A system of determining presence of an advertisement in an image, the system comprising:
   a processor; and
   a memory accessible to the processor, the memory storing instructions executable by the processor, the instructions comprising instructions for:
   receiving an image related to a first geographic location;
   detecting, with a processor, a face in the image;
   comparing, with the processor, the detected face to a plurality of faces found in a plurality of images, at least one of the plurality of images being related to a second geographic location;
   determining, based on the comparison, whether an advertisement with the detected face is present in the received image; and
   analyzing image features outside the detected face when it is determined that an advertisement is present in the received image.

15. The system of claim 14, wherein detecting a face in the image comprises analyzing the image with a sliding-window face detector tuned based on recall and precision.

16. The system of claim 14, wherein the instructions for comparing comprises instructions for:
   fingerprinting the detected face to represent the detected face in a data set of a vector of numbers; and
   comparing the fingerprint of the detected face to fingerprints for corresponding ones of the plurality of faces.

17. The system of claim 16, wherein the fingerprinting is performed using Haar wavelet decomposition.

18. The system of claim 16, wherein the fingerprinting is performed with SIFT or Congas features of the detected face.

19. The system of claim 16, wherein the instructions for comparing further comprises instructions for hashing the vector of numbers through locality sensitive hashing or standard string hashing.

20. The system of claim 14, wherein the instructions for determining if the advertisement is present comprises instructions for finding, from the plurality of faces, at least one face identical to the detected face.

21. The system of claim 14, wherein the instructions for determining if the advertisement is present comprises instructions for finding from the plurality of faces at least one face where the similarity between the detected face and the at least one face is above a predetermined threshold.

22. The system of claim 14, wherein the instructions for analyzing the image features comprises instructions for:
   extracting image features of areas outside the face in the received image; and
   matching the extracted image features to image features of areas outside the plurality of faces in the plurality of images.

23. The system of claim 14, wherein the instructions for analyzing the image features comprises instructions for determining a boundary of the advertisement.

24. The system of claim 23, wherein the boundary of the advertisement is determined through edge detection.

25. The system of claim 14, wherein at least another one of the plurality of images is related to the first geographic location and was captured at a time different from the time the image was taken.

26. The system of claim 14, wherein the advertisement comprises a billboard, a poster, and a banner.

27. A method of analyzing an image comprising:
- selecting a first and second street level image from among a plurality of street level images, wherein the street level images were captured at first and second times and first and second locations;
- detecting, with a processor, whether the first and second street level image contain an image associated with a face;
- for each face image detected in the first street level image, determining whether the face image is similar to a face image detected in the second image;
- determining, with a processor, whether the first level image has captured an advertisement based on whether the similarity of the detected face images from the first and second images indicate that the faces captured in the street level images are likely to be identical, and further based on the location and time that the street level images were captured; and
- identifying, with a processor, a portion of the first street level image that is likely to have captured an advertisement based on the image information surrounding the detected face image of the first street level image.

28. The method of claim 27 wherein determining whether each street level image has captured an advertisement based on the location and time that the street level images were captured comprises determining whether the time and location of the first and second street level image are sufficiently different to make it unlikely that the detected face images are of the same person being physically present at the first and second locations at the time the street level images were captured.

29. The method of claim 28 wherein the first and second locations are the same and the differences in capture times make it unlikely that the detected face images are of the same person being physically present at the first and second locations at the time the street level images were captured.

30. The method of claim 28 comprising displaying the first street level image to a user with a new advertisement replacing the advertisement captured in the street level image.

31. The method of claim 27 wherein identifying a portion of the first street level image that is likely to reflect an advertisement comprises using edge detection to identify the boundaries of an advertisement containing the detected face image.

32. The method of claim 27 further comprising detecting, with a processor, whether a third street level image contains an image associated with a face, and wherein determining, with a processor, whether the first street level image has captured an advertisement is further based on whether the similarity of the detected face images from the first, second and third images indicate that the faces captured in the three street level images are likely to be identical, and further based on the location and time that the street level images were captured.

33. The method of claim 27 wherein determining whether each street level image has captured an advertisement further comprises analyzing the three-dimensional location of the surface of the face.

34. The method of claim 27 wherein determining whether each street level image has captured an advertisement further comprises analyzing the three-dimensional location of the surfaces surrounding the face.

\* \* \* \* \*